UNITED STATES PATENT OFFICE.

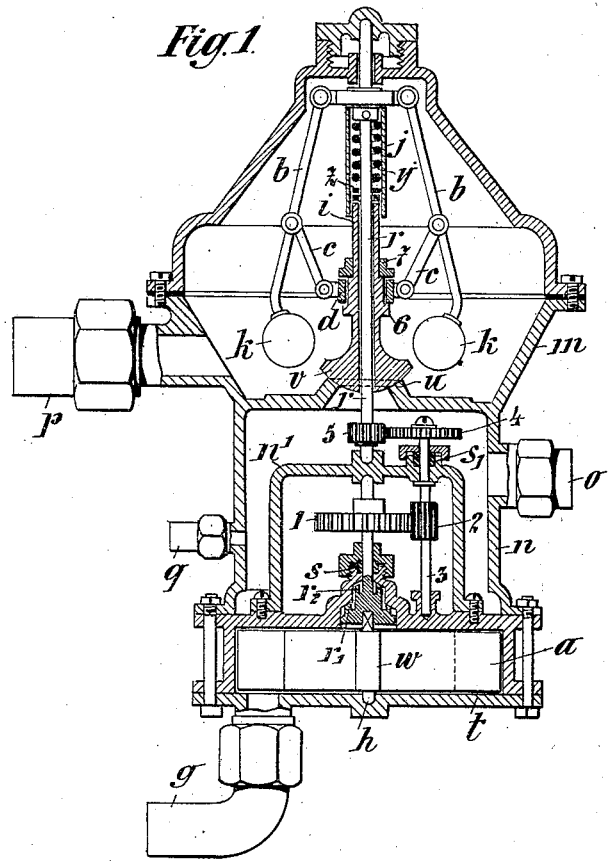

SIEGFRIED BONDY, OF VIENNA, AUSTRIA-HUNGARY, ASSIGNOR TO KARL KRUP-ITSCHKA, OF VIENNA, AUSTRIA-HUNGARY.

GAS-SUPPLY REGULATOR FOR WATER-HEATERS.

1,067,458.  Specification of Letters Patent.   Patented July 15, 1913.

Application filed August 10, 1912. Serial No. 714,414.

*To all whom it may concern:*

Be it known that I, SIEGFRIED BONDY, subject of the Emperor of Austria-Hungary, and resident of Vienna, in the Empire of Austria-Hungary, have invented a certain new and useful Improvement in Gas-Supply Regulators for Water-Heaters, of which the following is a specification, reference being had therein to the accompanying drawing.

The invention relates to a regulator for water heaters.

According to the invention the regulator is built into the water supply pipe and a throttling member is inserted in the gas pipe the flow in the latter being regulated by the shaft of a turbine arranged in the cold water pipe which operates a centrifugal governor.

In the drawing: Figure 1 illustrates the automatic regulator in accordance with my invention. Fig. 2 is a section of the turbine casing and Fig. 3 illustrates a modified form of valve.

As will be seen on reference to the accompanying drawings, on the bottom of the apparatus, the turbine casing $t$ having a turbine $a$ is arranged above which is the gear case $n$ and above this is the governor case $m$. The gas enters the case $n$ at $o$ and issues from the case $m$ at $p$. The gas valve is located in the bottom of the latter case. The water under pressure enters at $e$ and is supplied to the automatic heater through the pipe $g$; the various draw-off places are provided on the heater. This construction of the gas pressure regulator renders possible a compact arrangement of the several parts of the apparatus while the valve is protected in such a manner that escaping gas and the consequence thereof need not be feared. This assemblage also permits of such a form of valve that it is able to regulate the passage of the gas very exactly, the valve being automatically ground smoothly into its seat as it rotates with the spindle of the centrifugal governor.

The turbine shaft $w$, has its lower end mounted on the step bearing $h$, its upper end resting in a stuffing box, in the cover of the turbine case and by means of the gears 1, 2 transmits geared-up motion to the counter shaft 3. This counter shaft is built into a separate case $n'$ the cover of which receives the upper bearing of the turbine shaft and the step bearing of the spindle $r$ of the centrifugal governor $b$, $c$, $k$ controlling the valve $u$, $v$. The counter shaft 3 enters the outer middle case $n$ through a stuffing box $s'$ in which, by means of the second set of tooth gears 4, 5 the counter shaft transmits geared-up motion to the governor spindle $r$ which is mounted in the upper chamber $m$ coaxially with the turbine shaft and carries the centrifugal ball levers $b$, $c$, $k$ which upon the rotation of the spindle $r$ lift the valve body $v$ rotating with the governor rod.

The gas passes through inlet $o$ into the middle chamber $n$ and leaves the automatic regulator at the governor casing $m$ through the pipe $p$ leading to the heater. The seat $u$ of the gas valve is formed in the partition between the gear case and the governor case, in the form of a concave surface in which the correspondingly curved joint face of the valve body $v$ rests. The latter is made sufficiently heavy to readily fall back under the influence of gravity alone and form an efficient joint, the governor spindle $r$ passing loosely through its central bore.

So long as all the draw-off cocks or the like are closed the turbine shaft remain stationary and the valve $u$, $v$ is closed so that only the constantly open pilot light which is supplied through the pipe $q$ is burning. When a draw-off cock or the like is opened the turbine is rotated and its number of revolutions increases with the number of draw-off places opened or with the total quantity of water withdrawn through them. The number of revolutions of the governor increases proportionately to the number of revolutions of the turbine and therefore in proportion to the quantity of water withdrawn to be heated, this increase taking place in a very sensitive manner owing to the gearing-up, and the lift of the valve body $v$ and the free passage through the gas valve are also proportionately increased. When the consumption of water falls, the governor runs more slowly whereby the valve is moved farther closed and when the turbine comes to rest the valve body falls back on its seat and entirely cuts off the supply of gas.

In order to prevent gas from passing between the governor spindle and the valve body when the valve is closed the sleeve $i$ of the valve body is guided in a socket $j$ fixed concentrically on the spindle head and a joint is formed by a packing $z$ which is applied by the spring $y$. This spring also assists to apply the valve body to its seat and acts in opposition to an excessive lift which only serves to increase the cross section for the passage for the gas within certain limits.

The special method in accordance with the invention of positively coupling the valve body with the governor in such a manner that the valve is lifted by the governor while being simultaneously rotated, is of especial importance for the permanent maintenance of a good joint at the valve. This causes the valve to be ground automatically in sliding in its seat each time the valve body falls back and by this means and also owing to the conical form of the seat the adherence of foreign bodies in the passage is prevented.

In order that, if the draw-off places are not completely closed so that they drip, the slowly running turbine may not cause the valve to open, the arms $c$ of the governor are fitted to the valve body in such a manner that it is only after some idle travel, that is to say only commencing with a given number of revolutions which may correspond to a small discharge at a draw-off cock, that the valve is lifted from its seat. With this object the arms $c$ engage the ring $d$ which loosely surrounds the valve body in the restricted portion between the annular collars 6 and 7 and its upper edge is slightly separated from the upper collar 7 when the spindle is stationary and the valve closed.

In the form of valve shown in Fig. 3, the valve body is formed as a piston $v'$ which slides in a valve bush $u'$ which is provided with perforations or longitudinal slots for the passage of the gas; in the lower stationary position of the piston these holes are completely covered by it and in proportion to the ascent of the piston which is connected with the governor in exactly the same manner as the valve body $v$ (Fig. 1) these holes are freed. Here also the first row of holes or the lower edge of the slots is located so far above the lower edge of the piston that no gas can pass with a very small discharge of water.

It is very important to cut off the turbine casing completely from the gear chamber. In order to do this, in addition to the stuffing box, and for the purpose of relieving same, a metal packing is provided between the spindle and the cover of the casing as the lower edge of a bell extension $r'$ of the spindle runs on a correspondingly formed joint face on the cover of the casing on which it constantly slides. This in itself affords a good joint and the stuffing box has merely to serve as a reserve packing. A number of concentric annular bell packings may if desired be provided. In the drawing, however, the turbine shaft $w$ carries a second bell extension $r^2$ which so long as the ring $r'$ has not been worn away to any considerable extent is not in contact with its counter surface with which it contacts only when the ring $r'$ is much worn, whereupon it coöperates with the latter. By modifying the transmission of the turbine to the governor by fitting a heavier or a lighter hollow valve body, or different centrifugal governors, or a stronger or weaker counter spring and so forth, the conditions in which the pressure regulator affords a passage can be regulated in a simple manner. Explosions of gas or explosions owing to overheating or incorrect operation of the valve mechanisms are practically impossible.

Having now described my invention and explained the nature of its operation, what I claim is:

1. An automatic regulator for water heaters, adapted to be inserted in the supply pipe and embodying a throttling member interposed in the gas pipe, a shaft, a governor on said shaft to regulate said member, a turbine inserted in the water pipe, a vertical shaft geared to said first mentioned shaft and adapted to be rotated thereby, carrying said turbine, said throttling member being loosely mounted on said first mentioned shaft and adapted to participate in a movement of rotation with said governor.

2. An automatic regulator for water heaters comprising a turbine casing, a turbine therein mounted on a vertical shaft, an inlet to said casing of water under pressure, said shaft stepped in the bottom of said turbine casing, a packing in the cover of said casing the upper end of said shaft being keyed in said packing, a middle chamber on said casing, an inner casing $n'$, gearing in said inner casing connected with gearing in said middle chamber, a governor casing on said middle chamber, a governor shaft stepped on said inner casing, a valve seat in the top of said inner chamber through which said governor shaft extends, a sleeved valve on said governor shaft above said valve seat and an outlet pipe $p$, for said gas.

In testimony whereof I affix my signature in the presence of two witnesses.

SIEGFRIED BONDY.

Witnesses:
FRIEDRICH BINDER,
AUGUST FUGGER.